United States Patent
Yamamura et al.

(10) Patent No.: US 8,414,828 B2
(45) Date of Patent: Apr. 9, 2013

(54) NI-BASED CORROSION RESISTANT ALLOY AND CORROSION RESISTANT MEMBER FOR SUPERCRITICAL AMMONIA REACTOR MADE OF THE ALLOY

(75) Inventors: Yoshihiko Yamamura, Muroran (JP); Shinya Sato, Muroran (JP); Shinichi Nishiya, Muroran (JP)

(73) Assignees: Furuya Metal Co., Ltd., Tokyo (JP); Mitsubishi Chemical Corporation, Tokyo (JP); Tokyo Denpa Co., Ltd., Tokyo (JP); Tsuguo Fukuda, Miyagi (JP); The Japan Steel Works, Ltd., Tokyo (JP)

( * ) Notice: Subject to any disclaimer, the term of this patent is extended or adjusted under 35 U.S.C. 154(b) by 0 days.

(21) Appl. No.: 12/064,297

(22) PCT Filed: Aug. 22, 2006

(86) PCT No.: PCT/JP2006/316381
§ 371 (c)(1),
(2), (4) Date: Feb. 20, 2008

(87) PCT Pub. No.: WO2007/023797
PCT Pub. Date: Mar. 1, 2007

(65) Prior Publication Data
US 2009/0280024 A1    Nov. 12, 2009

(30) Foreign Application Priority Data
Aug. 25, 2005 (JP) ................................ 2005-243746

(51) Int. Cl.
*C22C 19/05* (2006.01)

(52) U.S. Cl.
USPC ........................................................ 420/453

(58) Field of Classification Search ................... 420/450, 420/453
See application file for complete search history.

(56) References Cited

U.S. PATENT DOCUMENTS

| | | | |
|---|---|---|---|
| 2,392,821 A | | 1/1946 | Kreag |
| 2,781,264 A | * | 2/1957 | Gresham et al. ............. 420/450 |
| 3,455,659 A | * | 7/1969 | Longfield et al. ........... 23/293 R |
| 3,510,294 A | | 5/1970 | Bieber et al. |
| 3,918,964 A | | 11/1975 | Baldwin et al. |
| 4,224,300 A | | 9/1980 | Takahashi et al. |
| 4,331,741 A | * | 5/1982 | Wilson ........................... 428/679 |
| 4,533,414 A | | 8/1985 | Asphahani |
| 4,981,644 A | * | 1/1991 | Chang ............................ 420/442 |
| 5,424,029 A | | 6/1995 | Kennedy et al. |
| 2005/0129567 A1 | | 6/2005 | Kirchheiner et al. |

FOREIGN PATENT DOCUMENTS

| | | |
|---|---|---|
| EP | 0 091 308 A2 | 10/1983 |
| EP | 0 254 982 A2 | 2/1998 |
| JP | 45-36659 B1 | 11/1970 |
| JP | 62-11447 B2 | 3/1987 |
| JP | 1-301841 A | 12/1989 |
| JP | 06-256885 * | 9/1994 |
| JP | 2000-334595 A | 12/2000 |
| JP | 2002-194466 * | 7/2002 |
| JP | 2002-266059 * | 9/2002 |
| JP | 2004-003021 A | 1/2004 |
| JP | 2005-133156 A | 5/2005 |

OTHER PUBLICATIONS

Douglass, D.L. and Wu, M.Z., Sulfidation Behavior of Ni-Cr-Mo Alloys at 700° C, Oxidation of Metals, vol. 22, Nos. 1/2, Jan. 24, 1984, pp. 45-57.*
English Abstract and English Machine Translation of JP 2002-266059 (2002).*
English Abstract and English Machine Translation of JP 2002-194466 (2002).*
Abstract and English Machine Translation of Hidaka et al. (JP 06-256885) (1994).*
Chinese Office Action dated Jun. 26, 2009.
Japanese Office Action dated Sep. 8, 2009.
Office Action dated Aug. 25, 2010 from the Japanese Patent Office in Japanese counterpart application No. 2005-243746.
Office Action dated Mar. 2, 2011 in Japanese Patent Application No. 2005-243746.

* cited by examiner

*Primary Examiner* — Jessee R. Roe
(74) *Attorney, Agent, or Firm* — Sughrue Mion, PLLC

(57) ABSTRACT

A material is presented that exhibits excellent corrosion resistance to supercritical ammonia and is suitable for a supercritical ammonia reactor. An Ni-based corrosion resistant alloy includes from 15% or more to 50% or less by mass of Cr and any one or both of Mo and W, wherein a [(content of Mo)+ 0.5×(content of W)] is from 1.5% or more to 8.5% or less by mass, a value of 1.8×[% content of Cr]/{[% content of Mo]+ 0.5×[% content of W]} is from 3.0 or more to 70.0 or less and the balance is Ni and an unavoidable impurity. The alloy may be used to configure a supercritical ammonia reactor or the material is coated on a surface that contacts with a supercritical ammonia fluid. The alloy exhibits excellent corrosion resistance to supercritical ammonia and a mineralizer added the supercritical ammonia. The safety and reliability of an apparatus can be improved, the producing cost can be reduced, the apparatus lifetime can be extended and the running cost can be reduced.

1 Claim, 3 Drawing Sheets

NI-BASED CORROSION RESISTANT ALLOY AND CORROSION RESISTANT MEMBER FOR SUPERCRITICAL AMMONIA REACTOR MADE OF THE ALLOY

TECHNICAL FIELD

The present invention relates to an Ni-based corrosion resistant alloy suitable for a material excellent in the corrosion resistance for inhibiting a reactor that uses a supercritical ammonia fluid as a solvent like in a growth technology of a nitride single crystal by means of for instance an ammonothermal process from corroding and a corrosion resistant member for a supercritical ammonia reactor made of the alloy.

BACKGROUND ART

In a nitride single crystal growth process according to for instance an ammonothermal process (see Patent Document 1), in an ammonia atmosphere under a supercritical state (temperature: 405.6K and pressure: 11.3 MPa at a critical point of ammonia), a nitride single crystal such as gallium nitride or the like is grown. The supercritical ammonia that is high in the temperature and pressure is very large in the corrosiveness; accordingly, in a reactor such as a high temperature and pressure vessel or the like, a countermeasure for inhibiting the corrosion is very important. Furthermore, a mineralizer (chlorine-based compounds) added to the supercritical ammonia when a nitride single crystal is grown further increases the corrosiveness.

In the existing technology, in order to inhibit the corrosion, a method where an apparatus portion that comes into contact with a supercritical fluid is covered with a noble metal such as Pt, Ir or the like, or an alloy or oxide thereof is proposed (see Patent Documents 2 and 3).

Patent Document 1: JP-A-2003-277182
Patent Document 2: JP-A-2001-170478
Patent Document 3: JP-A-2002-361069

DISCLOSURE OF THE INVENTION

Problems that the Invention is to Solve

However, in a method that uses a noble metal, in addition to causing an increase in an apparatus production cost, since, in many cases, a coating is relatively thin in the thickness and is not so strong in the strength, there is a fear in that the noble metal may be broken to expose an apparatus member that is an underlayer to a corrosive fluid.

The invention is carried out to overcome the existing problems such as mentioned above and intends to provide an Ni-based corrosion resistant alloy that, in an apparatus that handles supercritical ammonia, can reduce a usage amount of precious noble metal and can inhibit the apparatus from corroding, and a corrosion resistant member for a supercritical ammonia reactor made of the alloy.

Means for Solving the Problems

That is, the Ni-based corrosion resistant alloy of the invention includes from 15% or more to 50% or less by mass of Cr and any one or both of Mo and W, [(content of Mo)+0.5× (content of W)] being from 1.5% or more to 8.5% or less by mass and the balance being Ni and unavoidable impurities.

Further, in the Ni-based corrosion resistant alloy of the invention, a value of 1.8×[Cr content %]/{[Mo content %]+0.5×[W content %]} is from 3.0 or more to 70.0 or less by mass.

Further, in the Ni-based corrosion resistant alloy of the invention, Fe is the unavoidable impurity and is contained less than 3% by mass.

Still further, in the Ni-based corrosion resistant alloy of the invention, C is the unavoidable impurity and is less than 0.05% by mass.

Still further, a corrosion resistant member for a supercritical ammonia reactor of the invention includes the Ni-based corrosion resistant alloy.

Still further, a corrosion resistant member for a supercritical ammonia reactor of the invention includes the Ni-based corrosion resistant alloy and the corrosion resistant member is formed as a coated layer on a surface that contacts with a supercritical ammonia fluid.

Advantage of the Invention

The above-described Ni-based corrosion resistant alloy of the invention exerts excellent corrosion resistance. A member for a supercritical ammonia reactor where the alloy is applied exhibits excellent corrosion resistance to supercritical ammonia and exerts excellent corrosion resistance as well to a mineralizer (chlorine-based compound) added to supercritical ammonia. Furthermore, when an apparatus is constituted of the Ni-based alloy excellent in the corrosion resistance in supercritical ammonia, in addition to an improvement in the safety and reliability of the apparatus, the production cost can be reduced, the apparatus lifetime can be extended and the running cost can be reduced.

BEST MODES FOR CARRYING OUT THE INVENTION

Figure 1:
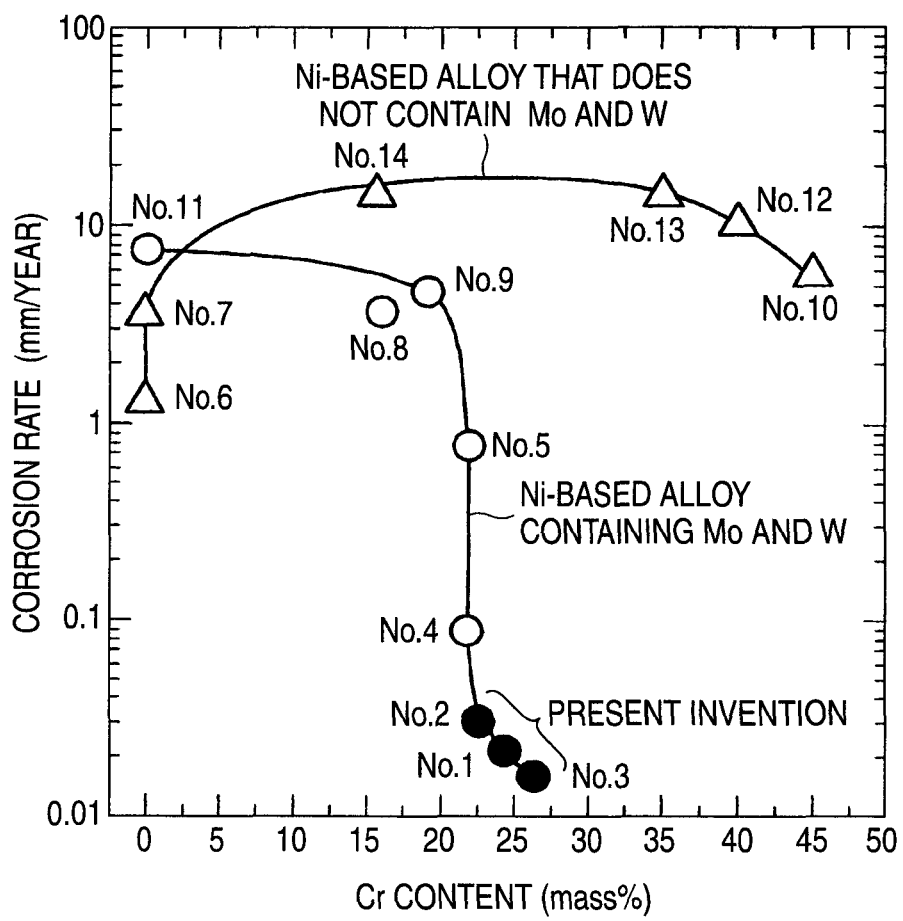
FIG. 1 A graph showing an influence of a Cr content and a Mo or W content on a corrosion rate.

The Ni-based alloy of the invention may be produced by melting, forging, rolling or casting, followed by processing as an apparatus member. A producing process thereof is not particularly restricted in the invention. Any of known processes may be adopted.

The Ni-based corrosion resistant alloy of the invention may be used in various applications as a material excellent in the corrosion resistance. That is, the alloy of the invention is not restricted to a particular application. However, as mentioned above, the alloy exhibits, to supercritical ammonia, excellent corrosion resistance that cannot be obtained by other materials; accordingly, the alloy may be provided preferably as a corrosion resistant member for ammonia, particularly preferably as an ammonia reactor and most preferably as a supercritical ammonia reaction vessel.

Furthermore, when the alloy is used as a corrosion resistant member for a supercritical ammonia reactor, the alloy may be molded according to an appropriate processing method to constitute an ammonia reactor, or the members thereof may be combined to form an ammonia reactor. The member may not be used over an entirety of a supercritical ammonia reactor, that is, the member may be used only in a portion such as a surface in contact with a supercritical ammonia fluid.

Furthermore, the corrosion resistant member for a supercritical ammonia reactor, in addition to the use as a structural material of a reactor, may be used as a covering material. That is, in particular, the member may be disposed as a covering layer on a surface in contact with a supercritical ammonia fluid. A process for forming the covering layer, without restricting to particular process, may be any one of known processes. For instance, means such as the welding overlaying, the shrink fitting or the like may be adopted.

In the next place, examples of the invention will be described.

In what follows, actions of components in the invention and limiting reasons of contents thereof will be described. The unit of the following contents as used herein is % by mass unless otherwise specified.

Cr: 15% or more and less than 50%

In supercritical ammonia, Cr forms a film of Cr nitride. However, when both Mo and W are not contained, since a stable and protecting film cannot be formed, a corrosion-inhibiting effect cannot be obtained. The Cr, when Mo or W is added, can form a stable and protecting film and develops the corrosion-inhibiting effect. Accordingly, Cr is necessarily contained by 15% or more. However, when it is contained 50% or more, the processing becomes difficult. Because of the similar reason, preferably, the lower limit is 20% and the upper limit is 30%, and more preferably the lower limit is 23%.

Mo and W: [(Content of Mo)+0.5×(content of W)] 1.5% or more and 8.5% or less

Then, Mo and W, in the coexistence with Cr, form a Cr(Mo—W) nitride film stable and large in the protectiveness to contribute to the corrosion inhibition. For this, [(content of Mo)+0.5×(content of W)] is necessarily 1.5% or more; however, when it is contained more than 8.5%, the stability of a nitride film is damaged to lose the advantage of the corrosion inhibition. Either one of Mo and W alone may well be contained. The [(content of Mo)+0.5×(content of W)] is preferably 3% in the lower limit and 8% in the upper limit.

A value of 1.8×[% content of Cr]/{[% content of Mo]+0.5×[% content of W]} being 3.0 or more and 70.0 or less When the value is less than 3.0, since, in comparison with the Cr content, the Mo content or W content is excessively larger, the stability of a protective film is damaged. On the other hand, when the value exceeds 70, since, in comparison with the Cr content, the Mo content or W content is much scarce, a stable protective film cannot be formed. Accordingly, the value is desirably set at 3.0 or more and 70.0 or less. Preferably, the lower limit value is 5 and the upper limit value is 10.

Fe: less than 3%

In the next place, Fe is contained as an unavoidable impurity, lowers the stability of a nitride protective film and deteriorates the corrosion resistance. Accordingly, the smaller the Fe content is the better and the Fe content is desirably set at less than 3% and preferably at 0.5% or less.

C: less than 0.05%

C is contained as an unavoidable impurity and forms Cr carbide in a grain boundary to lower the corrosion resistance. Accordingly, the smaller the C content is the better and the C content is desirably set at less than 0.05%.

The balance is constituted of Ni and other unavoidable impurities.

In Table 1, chemical components of examples 3 are shown. Furthermore, as comparative materials, various kinds of Ni-based alloys were used.

From alloys having the compositions, test pieces having a dimension of 3 mm×8 mm×16 mm were prepared according to a standard process.

The respective test pieces were held in supercritical ammonia and the corrosion rates were calculated from weight variations of the test pieces before and after the test. In the test, a high temperature and high pressure autoclave experimental device was used and a temperature, pressure and a holding time, respectively, were set at substantially 500° C., substantially 1100 MPa and 72 hr. In supercritical ammonia, 0.14% by mole of $NH_4Cl$ was added.

In FIG. 1, an influence of the Cr content on the corrosion rate of the Ni alloy is shown. When the alloy does not contain Mo and W, since, as the Cr content increases, the corrosion rate increases, it is found that a material made of Cr alone is deteriorated in the corrosion resistance. However, in the case of a material containing Mo or W, when the Cr content exceeded 20%, the corrosion rate was lowered. In particular, when the Cr content exceeded 23%, the corrosion rate was much lowered. It was found that it was important to make Cr coexist with Mo or W and Cr alone could not improve the corrosion resistance.

Figure 2:
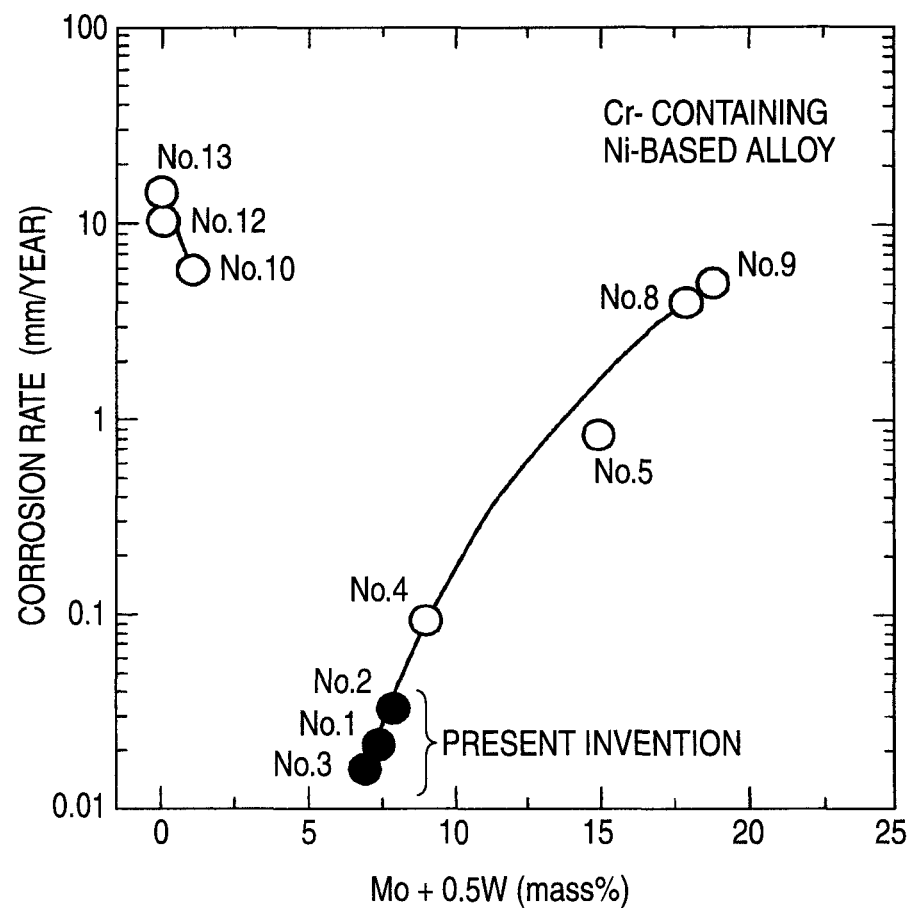
FIG. 2 A graph showing an influence of [(Mo content)+ 0.5×(W content)] on a corrosion rate of a Cr-containing Ni-based alloy.

In FIG. 2, an influence of [(Mo content)+0.5×(W content)] on the corrosion rate of the Cr-containing Ni alloy is shown.

When the [(Mo content)+0.5×(W content)] was less than 1.5%, the corrosion resistance could not be improved. However, when the [(Mo content)+0.5×(W content)] was 5.0% or more and 8.0% or less, the corrosion rate showed a small value. On the other hand, when the [(Mo content)+0.5×(W content)] exceeded 8.5%, the corrosion rate increased.

Figure 3:
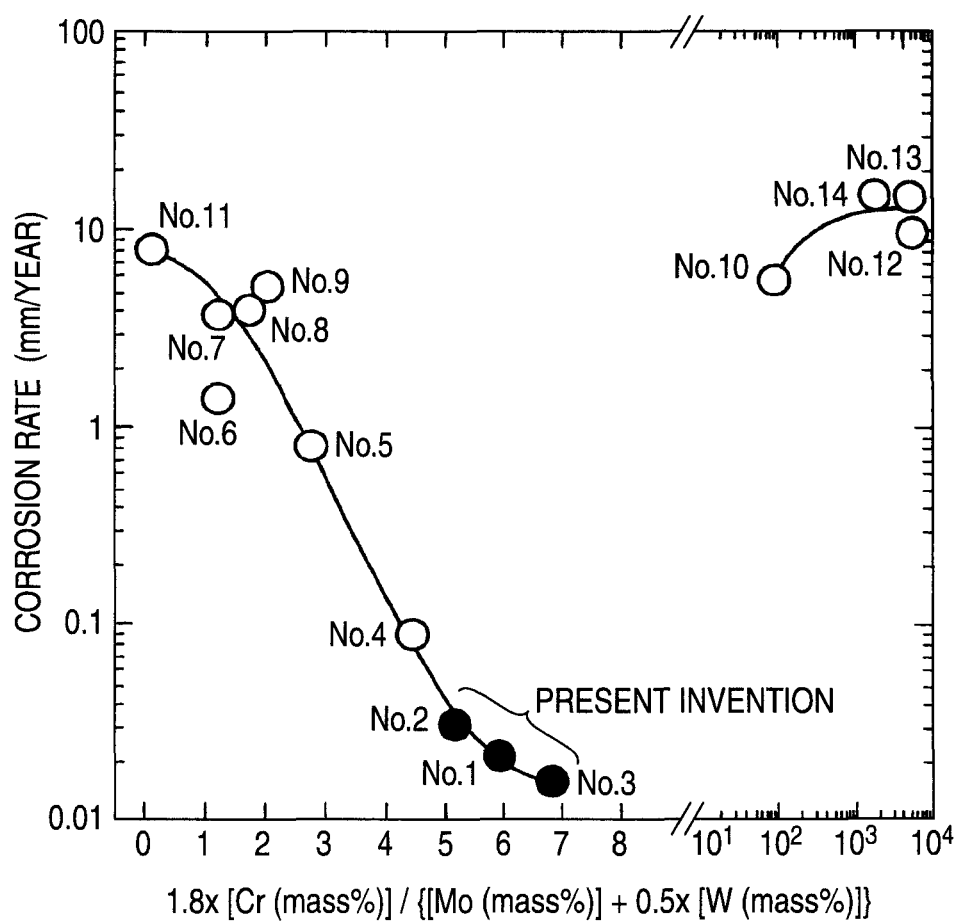
FIG. 3 A graph showing an influence of 1.8×[Cr content %]/{[Mo content %]+0.5×[W content %]} on a corrosion rate of an Ni-based alloy.

In FIG. 3, an influence of the 1.8×[% content of Cr]/{[% content of Mo]+0.5×[% content of W]} on the corrosion rate of the Ni alloy is shown.

As the value of 1.8×[% content of Cr]/{[% content of Mo]+0.5×[% content of W]} increases, the corrosion rate is lowered and, when the value of 1.8×[% content of Cr]/{[% content of Mo]+0.5×[% content of W]} is 5.0 or more, the corrosion resistance is remarkably improved. On the other hand, when the 1.8×[% content of Cr]/{[% content of Mo]+0.5×[% content of W]} exceeds 70, the corrosion resistance is much increased.

The Ni-based alloy of the invention is most effective in supercritical ammonia. However, without restricting thereto, the Ni-based alloy of the invention can be used as well in an ammonia fluid at temperature or pressure less than that of the critical point and can be applied as well in various kinds of chemical processors that use ammonia.

TABLE 1

| | Sample | Chemical Component (mass percent) | | | | | | | | | | |
|---|---|---|---|---|---|---|---|---|---|---|---|---|
| | | Fe | C | Ni | Cr | Mo | W | Nb | Ta | Cu | Mo + 0.5W | 1.8Cr/(Mo + 0.5W) |
| Present Invention | 1 | <0.1 | <0.01 | Balance | 25.0 | 0.01 | 14.9 | — | — | — | 7.5 | 6.0 |
| | 2 | <0.1 | <0.01 | Balance | 23.1 | 2.1 | 11.7 | — | — | — | 8.0 | 5.2 |
| | 3 | <0.1 | <0.01 | Balance | 26.8 | 4.8 | 4.5 | — | — | — | 7.1 | 6.8 |

TABLE 1-continued

| | | | | | Chemical Component (mass percent) | | | | | | | |
|---|---|---|---|---|---|---|---|---|---|---|---|---|
| Sample | | Fe | C | Ni | Cr | Mo | W | Nb | Ta | Cu | Mo + 0.5W | 1.8Cr/(Mo + 0.5W) |
| Comparative | 4 | 2.8 | 0.02 | Balance | 21.7 | 8.9 | 0.01 | 3.4 | — | — | 8.9 | 4.4 |
| Example | 5 | 3.3 | 0.01 | Balance | 22.4 | 13.4 | 3.8 | — | — | — | 15.3 | 2.6 |
| | 6 | <0.1 | 0.09 | Balance | 0.01 | 0.01 | 0.01 | — | — | — | 0.02 | 1.2 |
| | 7 | <0.1 | 0.12 | Balance | 0.01 | 0.01 | 0.01 | — | — | 29.2 | 0.02 | 1.2 |
| | 8 | 5.8 | <0.01 | Balance | 15.4 | 15.8 | 4.1 | — | — | — | 17.9 | 1.6 |
| | 9 | 0.7 | <0.01 | Balance | 19.0 | 18.7 | 0.01 | — | 1.9 | — | 18.7 | 1.8 |
| | 10 | <0.1 | <0.01 | Balance | 44.3 | 1.0 | 0.01 | — | — | — | 1.0 | 79.3 |
| | 11 | 1.4 | <0.01 | Balance | 0.01 | 27.8 | 0.01 | — | — | — | 27.8 | 0.0 |
| | 12 | <0.1 | <0.01 | Balance | 40.1 | 0.01 | 0.01 | — | 2.1 | — | 0.0 | 4812 |
| | 13 | <0.1 | <0.01 | Balance | 34.9 | 0.01 | 0.01 | — | 2.1 | — | 0.0 | 4188 |
| | 14 | 6.8 | 0.04 | Balance | 15.5 | 0.01 | 0.01 | — | — | — | 0.0 | 1860 |

The invention was described in detail with reference to particular embodiments. However, it is obvious for a person skilled in the art that without deviating from the spirit and scope of the invention various modifications and corrections may be applied.

The application claims priority from Japanese Patent Application No. 2005-243746 dated on Aug. 25, 2005, the disclosure of which is incorporated by reference herein.

INDUSTRIAL APPLICABILITY

The Ni-based corrosion resistant alloy of the invention exerts excellent corrosion resistance. A corrosion resistant member for a supercritical ammonia reactor to which the alloy is applied exhibits excellent corrosion resistance to supercritical ammonia and exerts excellent corrosion resistance as well to a mineralizer (chlorine-based compound) added to supercritical ammonia. Furthermore, when an apparatus is constituted of the Ni-based alloy excellent in the corrosion resistance in supercritical ammonia, the safety and reliability of the apparatus can be improved, and moreover the reduction of producing cost, elongation of the apparatus lifetime and reduction of the running cost can be achieved.

The invention claimed is:

1. A corrosion resistant member for a supercritical ammonia reactor comprising a Ni-based corrosion resistant alloy, the Ni-based corrosion resistant alloy consisting essentially of: from 15% or more to 50% or less by mass of Cr; and at least one of Mo and W, wherein a [(content of Mo)+0.5 ×(content of W)] is from 1.5% or more to 8.5% or less by mass, and wherein the balance consists essentially of Ni and unavoidable impurities, wherein the corrosion resistant member comprising a Ni-based corrosion resistant alloy is formed as a covering layer on a surface that contacts with a supercritical ammonia fluid, and wherein the unavoidable impurities consist essentially of Fe in an amount of more than 0% to less than 3% by mass and C in an amount of more than 0% to less than 0.05% by mass.

* * * * *